United States Patent Office.

CHARLES LENNIG, OF PHILADELPHIA, PENNSYLVANIA.

Letters Patent No. 60,753, dated January 1, 1867.

IMPROVED COMPOUND FOR SALINE MEDICATED BATHS.

*The Schedule referred to in these Letters Patent and making part of the same.*

TO ALL WHOM IT MAY CONCERN:

Be it known that I, CHARLES LENNIG, of the city of Philadelphia, and State of Pennsylvania, have invented a new and useful composition of matter called "Strumatic Salts;" and I do hereby declare the following to be a full and exact description of the mode.

We mix the various articles in about the proportion named below, concentrated into a solid mass, or we use the natural mineral waters containing the greater number of the salts, and evaporate them to dryness, adding such as are wanting. The composition of the article is as follows: silica sand, 0.0495; chloride of iron, 0.1465; barium, 0.3336; strontium, 0.0039; chloride of calcium, 57.9757; chloride of magnesium, 23.6823; chloride of sodium, 4.0380; chloride of potassium, 1.2785; iodide of magnesium, 0.1412; bromide of magnesium, 1.1316; magnesia, 11.2629; alumina, .00083—phosphate alumina. The article is melted and formed into moulds, and then packed into air-tight packages of one to ten pounds each, and when used, one or two pounds are dissolved with from two to four pounds of common salts. The utility of these baths is especially for rheumatism, neuralgia, and glandular diseases of all kinds.

What I claim, and desire to secure by Letters Patent, is—

The composition of matter called "strumatic salts," put up in the form and packages as above named, substantially as above set forth.

CHARLES LENNIG.

Witnesses:
    W. W. DOUGHERTY,
    GEO. BUCKLEY.